(12) United States Patent
Jeon et al.

(10) Patent No.: US 9,130,242 B2
(45) Date of Patent: Sep. 8, 2015

(54) GEL POLYMER ELECTROLYTE COMPOSITION, GEL POLYMER ELECTROLYTE AND ELECTROCHEMICAL DEVICE COMPRISING THE SAME

(75) Inventors: Jong-Ho Jeon, Daejeon (KR); Soo-Hyun Ha, Daejeon (KR); Jeong-Ju Cho, Daejeon (KR)

(73) Assignee: LG Chem, Ltd. (KR)

( * ) Notice: Subject to any disclaimer, the term of this patent is extended or adjusted under 35 U.S.C. 154(b) by 1305 days.

(21) Appl. No.: 12/519,835

(22) PCT Filed: Dec. 17, 2007
(Under 37 CFR 1.47)

(86) PCT No.: PCT/KR2007/006598
§ 371 (c)(1),
(2), (4) Date: Sep. 16, 2010

(87) PCT Pub. No.: WO2008/075867
PCT Pub. Date: Jun. 26, 2008

(65) Prior Publication Data
US 2011/0256456 A1    Oct. 20, 2011

(30) Foreign Application Priority Data
Dec. 21, 2006    (KR) .................... 10-2006-0131653

(51) Int. Cl.
*H01M 10/0565* (2010.01)
*H01M 10/0569* (2010.01)
*H01G 11/56* (2013.01)

(52) U.S. Cl.
CPC ........... *H01M 10/0565* (2013.01); *H01G 11/56* (2013.01); *H01M 10/0569* (2013.01); *H01M 2300/0037* (2013.01); *H01M 2300/0085* (2013.01); *Y02E 60/13* (2013.01); *Y02T 10/7022* (2013.01)

(58) Field of Classification Search
CPC ...................... H01M 10/0564–10/0569; H01M 10/052–10/054; H01M 2300/0025–2300/0042; H01M 2300/0082; H01G 11/56

USPC .......... 429/300, 303, 324, 326, 327, 330, 343
See application file for complete search history.

(56) References Cited

U.S. PATENT DOCUMENTS

| 6,013,393 A | 1/2000 | Taniuchi et al. |
| 6,645,675 B1 | 11/2003 | Munshi |
| 2003/0180623 A1 | 9/2003 | Yun et al. |
| 2005/0084764 A1* | 4/2005 | Lee et al. ...................... 429/317 |
| 2005/0227150 A1 | 10/2005 | Xing et al. |
| 2007/0141461 A1* | 6/2007 | Lin et al. ....................... 429/189 |

FOREIGN PATENT DOCUMENTS

| EP | 0531617 A1 | 3/1993 |
| JP | 2003533861 A | 11/2003 |
| KR | 20010048933 | 6/2001 |
| KR | 20030005255 | 1/2003 |
| KR | 20060040289 A | 5/2006 |
| WO | 0189020 A1 | 11/2001 |

OTHER PUBLICATIONS

"Ethyl Propanoate (aka Ethyl Propionate)." ChemSpider. Royal Society of Chemistry, Web. Accessed on: Oct. 5, 2013.*
Carbonate ester (May 21, 2010), XP002600540.
International Search Report, PCT/KR2007/006598, dated Mar. 13, 2008.

* cited by examiner

*Primary Examiner* — Edu E Enin-Okut
(74) *Attorney, Agent, or Firm* — Lerner, David, Littenberg, Krumholz & Mentlik, LLP

(57) ABSTRACT

A gel polymer electrolyte composition includes i) a compound acting as a monomer for forming gel polymer by polymerization and having at least two double bonds at an end thereof; ii) an electrolyte solvent containing carbonate and linear saturated ester; iii) an electrolyte salt; and iv) a polymerization initiator. A gel polymer electrolyte formed using the above composition has excellent mechanical strength and lithium ion conductivity. A secondary battery containing the gel polymer electrolyte has improved room/low temperature characteristics and rate capacity.

11 Claims, No Drawings

GEL POLYMER ELECTROLYTE COMPOSITION, GEL POLYMER ELECTROLYTE AND ELECTROCHEMICAL DEVICE COMPRISING THE SAME

CROSS REFERENCE TO RELATED APPLICATIONS

The present application is a national phase entry under 35 U.S.C. §371 of International Application No. PCT/KR2007/006598, filed Dec. 17, 2007, which claims the benefit of Korean Patent Application No. 10-2006-0131653, filed Dec. 21, 2006. The disclosures of said applications are incorporated by reference herein.

TECHNICAL FIELD

The present invention relates to a gel polymer electrolyte composition, a gel polymer electrolyte formed by polymerizing the same, and an electrochemical device comprising the gel polymer electrolyte. More particularly, the present invention relates to a gel polymer electrolyte composition allowing preparation of a gel polymer electrolyte having excellent mechanical strength and lithium ion conductivity, a gel polymer electrolyte formed by polymerizing the same, and an electrochemical device with improved performance by including the gel polymer electrolyte.

BACKGROUND ART

Recently, there has been an increasing interest in energy storage technology. Batteries have been widely used as energy sources in the fields of cellular phones, camcorders, notebook computers, PCs and electric cars, resulting in intensive research and development into them. In this regard, electrochemical devices are one of the subjects of great interest. Particularly, along with the trend directed to smaller and lighter electronic devices, development of rechargeable secondary batteries has been focused on a secondary battery as a small, light, large-capacity rechargeable battery.

Electrolyte used for electrochemical devices such as batteries and electric double layer capacitors using electrochemical reaction was mainly a liquid electrolyte, particularly an ion conductive organic liquid electrolyte obtained by dissolving salt into a non-aqueous organic solvent.

However, if such a liquid electrolyte is used, there arise problems in stability since electrode materials may be degraded, the organic solvent may be volatilized, and combustion may occur due to the temperature increase of surroundings or battery itself. In particular, a lithium secondary battery generates gas inside the battery due to decomposition of carbonate organic solvent and/or side reaction between the organic solvent and the electrode while the battery is charged or discharged, so the thickness of the battery may be expanded. In addition, at high temperature storage, such reaction is accelerated to further increase an amount of generated gas.

The gas continuously generated as mentioned above causes increase of inner pressure of the battery, which may deform a center of a certain surface of the battery, for example making an angled battery be inflated in a certain direction. In addition, there happens a local difference in adherence on an electrode surface inside the battery, so the electrode reaction may not occur identically in the entire electrode surface. Thus, it is inevitable to cause deterioration of performance and stability of the battery.

Generally, the stability of battery is improved in the order of liquid electrolyte<gel polymer electrolyte<solid polymer electrolyte, but it is also known that the performance of battery is decreased in that order. Due to the inferior battery performance as mentioned above, it is known that batteries adopting solid polymer electrolyte are not yet put into the market.

Meanwhile, the gel polymer electrolyte may keep a thickness of battery constantly since it ensures excellent electrochemical stability as mentioned above, and also the gel polymer electrolyte may allow to make a thin film battery since it ensures excellent contact between electrode and electrolyte due to inherent adhesive force of the gel.

The gel polymer electrolyte may be prepared in a state that an electrolyte solvent is impregnated among polymer matrix. At this time, properties of a gel polymer secondary battery may be changed depending on the used electrolyte solvent.

Ethylene carbonate frequently used as an electrolyte solvent of the gel polymer electrolyte ensures excellent dissociation and transfer of lithium ions due to high polarity, but it shows a problem of deteriorated low temperature performance of a secondary battery due to a high freezing point.

In addition, in case carbonate such as ethylene carbonate or propylene carbonate and ring ester such as gamma-butyrolactone (GBL) are used in mixture as an electrolyte solvent, low temperature performance of a secondary battery may be improved since the electrolyte solvent has a low freezing point, but there may be deterioration of battery performance since the ring ester shows bad impregnation with respect to electrode or separator and also decomposes $LiPF_6$ mainly used as an electrolyte salt.

DISCLOSURE OF INVENTION

Technical Problem

The present invention is designed to solve the problems of the prior art, and therefore it is an object of the present invention to provide a gel polymer electrolyte composition allowing preparation of a gel polymer electrolyte having excellent mechanical strength and lithium ion conductivity, particularly a gel polymer electrolyte composition capable of improving properties at room/low temperature and rate capacity, a gel polymer electrolyte formed by polymerizing the same, and an electrochemical device including the gel polymer electrolyte.

Technical Solution

In order to accomplish the above object, the present invention provides a gel polymer electrolyte composition, which includes i) a compound acting as a monomer for forming gel polymer by polymerization and having at least two double bonds at an end thereof; ii) an electrolyte solvent containing carbonate and linear saturated ester; iii) an electrolyte salt; and iv) a polymerization initiator.

In another aspect of the present invention, there is also provided a gel polymer electrolyte formed by polymerizing the above gel polymer electrolyte compound.

In still another aspect of the present invention, there is also provided an electrochemical device including a cathode, an anode and the above gel polymer electrolyte.

BEST MODE FOR CARRYING OUT THE INVENTION

Hereinafter, preferred embodiments of the present invention will be described in detail with reference to the accompanying drawings. It should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

A gel polymer electrolyte composition of the present invention uses a liquid precursor of gel polymer electrolyte that is one of components of an electrochemical device such as a secondary battery. The gel polymer electrolyte composition employs a compound having at least two double bonds at its end, which is a monomer capable of forming gel polymer by polymerization. For an electrolyte solvent, carbonate and linear saturated ester are used in mixture.

Generally, the gel polymer electrolyte is prepared in a way of including a monomer capable of forming gel polymer into an electrolyte and then polymerizing them. At this time, the performance of battery is changed according to 1) mechanical strength, 2) ion conductivity and 3) maintenance rate of solvent according to charging/discharging or temperature cycle of the gel polymer electrolyte.

Accordingly, the present invention allows to prepare a gel polymer electrolyte capable of ensuring excellent mechanical strength and improving various performances of battery such as room/low temperature characteristics and rate capacity by using the above gel polymer electrolyte composition.

That is to say, the monomer according to the present invention may conduct polymerization reaction in various ways since it has at least double bonds at its end. As a result, a polymer matrix with a planar structure and/or a net structure may be formed, and also mechanical strength of the gel polymer electrolyte may be improved.

In addition, in the present invention, carbonate and linear saturated ester are mixed as an electrolyte solvent, and this electrolyte solvent has a low viscosity. In particular, the linear saturated ester has a high impregnation rate for electrode or separator, so it may improve ion conductivity inside a battery. Also, the electrolyte solvent may prevent deterioration of battery performance caused by shrinkage of electrolyte at a low temperature since it has a low freezing point. Thus, the present invention may improve various performances of battery such as room/low temperature performance and rate capacity of a battery.

The gel polymer forming monomer employed in the present invention is a monomer capable of forming gel polymer by polymerization, and it is not specially limited if it is a compound having at least two double bonds at its end. For example, the monomer may be a compound having at least two vinyl groups or (meth)acrylate groups at its end.

The compound having vinyl groups is generally dissolved easily in an organic solvent, so it shows excellent affinity with an electrolyte solvent, and it may improve mechanical strength of a gel polymer electrolyte by forming a polymer matrix of a planar structure and/or a net structure. The polymer may have a low glass transition temperature ($T_g$) or elasticity.

In addition, the compound having (meth)acrylate groups contains ester groups, so it shows excellent affinity with carbonate and linear saturated ester, which are used as an electrolyte solvent, and thus it may prevent secession of the electrolyte solvent that may occur during charging/discharging. In addition, this compound may improve lithium ion conductivity inside a battery since it contains much polar oxygen.

The compound having at least two double bonds at its end may be a compound expressed in the following chemistry figure 1.

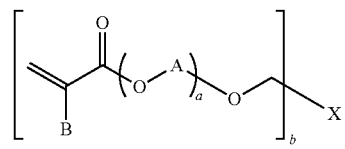

Chemistry FIG. 1

In the chemistry figure 1, A is alkylene of $C_1$~$C_{12}$ or haloalkylene of $C_1$~$C_{12}$; a is an integer of 0~30; B is H or methyl group; b is an integer of 2~6; X is

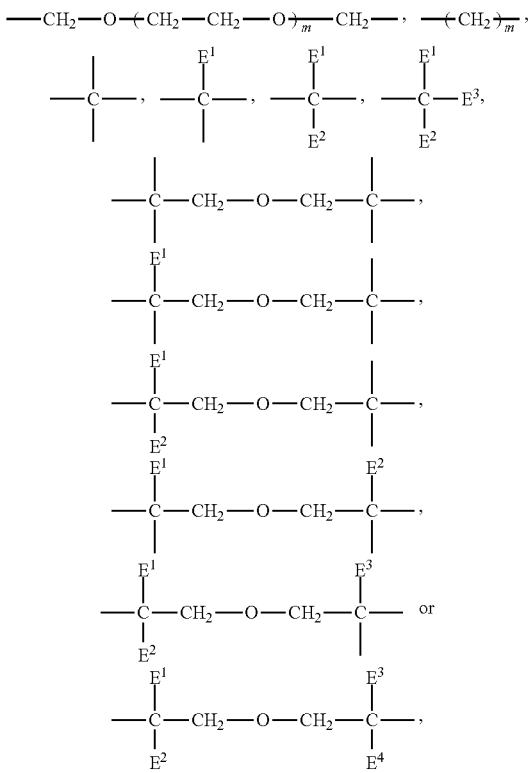

where $E^1$ to $E^4$ are respectively hydrogen, alkyl group of $C_1$~$C_{12}$, haloalkyl group of $C_1$~$C_{12}$, or hydroxyalkyl group of $C_1$~$C_{12}$ independently, and m is an integer of 0~30.

The compound having at least two double bonds at its end may be, unlimitedly, tetraethylene glycol diacrylate, poly ethylene glycol diacrylate having a molecular weight of 50~20,000, 1,4-butanediol diacrylate, 1,6-hexandiol diacrylate, trimethylolpropane triacrylate, trimethylolpropane ethoxylate triacrylate, trimethylolpropane propoxylate triacrylate, ditrimethylolpropane tetraacrylate, pentaerythritol tetraacrylate, pentaerythritol ethoxylate tetraacrylate, dipentaerythritol pentaacrylate, dipentaerythritol haxaacrylate and so on. These monomers may be used in single or in combination of at least two of them.

The compound having at least two double bonds at its end may be included in the gel polymer electrolyte composition in the content of 0.5 to 10 parts by weight, based on 100 parts by weight of the gel polymer electrolyte composition. If the content is less than 0.5 parts by weight, it is difficult to form gel polymer. If the content exceeds 10 parts by weight, dense gel polymer is formed, ion conductivity of a battery may be decreased since a small amount of electrolytic solvent is contained in the electrolyte, and performance of a battery may be deteriorated.

In the present invention, carbonate and linear saturated ester are mixed and then used as an electrolyte solvent.

The carbonate may be linear or ring carbonate, or their mixture. The ring carbonate may be, unlimitedly, ethylene carbonate (EC), propylene carbonate (PC), butylene carbonate (BC), fluoroethylene carbonate (FEC) and so on, and they may be used in single or in combination of at least two of them. The linear carbonate may be, unlimitedly, diethyl carbonate (DEC), dimethyl carbonate (DMC), dipropyl carbonate (DPC), ethyl methyl carbonate (EMC), methyl propyl carbonate (MPC) and so on, and they may be used in single or in combination of at least two of them.

In addition, the linear saturated ester may be, unlimitedly, methyl formate, ethyl formate, propyl formate, methyl acetate, ethyl acetate, propyl acetate, methyl propionate, ethyl propionate, butyl propionate, methyl pivalate and so on, and they may be used in single or in combination of at least two of them.

The content of the linear saturated ester is preferably 10 to 90 parts by weight, based on 100 parts by weight of the carbonate. If the content is less than 10 parts by weight, various performances of battery are not much improved by introduction of the linear saturated ester. If the content exceeds 90 parts by weight, side reaction excessively occurs between the linear saturated ester and graphite anode, which may deteriorate performance of battery.

The gel polymer electrolyte composition of the present invention includes electrolyte salt, and the electrolyte salt is not specially limited if it is commonly used as an electrolyte salt for battery. For example, the electrolyte salt may be a combination of (i) cation selected from the group consisting of $Li^+$, $Na^+$ and $K^+$, (ii) anion selected from the group consisting of $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$ and $C(CF_2SO_2)_3^-$, but not limitedly. These electrolyte salts may be used in single or in combination of at least two of them. In particular, lithium salt is preferred as the electrolyte salt.

The gel polymer electrolyte composition of the present invention can include a common polymerization initiator well known in the art. The polymerization initiator employed in the present invention is decomposed by heat to form radicals, and it is reacted with monomer by means of free radical polymerization to form a gel polymer electrolyte.

The polymerization initiator may be, not limitedly, organic peroxide or hydroperoxide such as benzoyl peroxide, acetyl peroxide, dilauryl peroxide, di-tert-butyl peroxide, t-butyl peroxy-2-ethyl-hexanoate, cumyl hydroperoxide, or hydrogen peroxide; or azo compound such as 2,2'-azobis(2-cyanobutane), 2,2'-azobis(methylbutyronitrile), AIBN (2,2'-azobis(iso-butyronitrile)) or AMVN (2,2'-azobisdimethyl-valeronitrile).

The polymerization initiator may be included in the gel polymer electrolyte composition in the content of 0.1 to 20 parts by weight, based on 100 parts by weight of the gel polymer electrolyte composition.

The gel polymer electrolyte composition according to the present invention may selectively contain other additives well known in the art, in addition to the above components.

The gel polymer electrolyte of the present invention is formed in a way of polymerizing the above gel polymer electrolyte composition according to a common method well known in the art. For example, the gel polymer electrolyte may be formed by means of in-situ polymerization of the gel polymer electrolyte composition inside an electrochemical device.

As a more preferred embodiment, the method for forming a gel polymer electrolyte may include the steps of: (a) putting an electrode assembly, formed by winding a cathode, an anode, and a separator interposed between the cathode and the anode, into an electrochemical device case; and (b) injecting the gel polymer electrolyte composition of the present invention into the case and then polymerizing it to form a gel polymer electrolyte.

The in-situ polymerization inside an electrochemical device may be progressed by means of thermal polymerization. At this time, the polymerization may take about 20 minutes to 12 hours at a temperature of 40 to 80° C.

In the present invention, the polymerization reaction is preferably conducted under an inert condition. If the polymerization reaction is conducted under the inert condition as mentioned above, reaction between radical and oxygen in the air acting as a radical quencher is fundamentally prevented, so the extent of polymerization reaction may be enhanced such that there exists substantially no monomer that is a non-reacted crosslinking agent. Thus, it is possible to prevent the charging/discharging performance from being deteriorated due to the presence of a large amount of non-reacted monomers in the battery.

The inert condition may be obtained using gases with low reactivity, well known in the art, particularly at least one kind of inert gas selected from the group consisting of nitrogen, argon, helium and xenon.

The electrochemical device of the present invention may include a cathode, an anode, a separator, and a gel polymer electrolyte formed by polymerizing the gel polymer electrolyte composition according to the present invention.

The electrochemical device may be any kind of element that makes electrochemical reaction, for example all kinds of primary batteries, secondary batteries, fuel cells, solar cells or capacitors. Particularly, a lithium secondary battery is preferred. The lithium secondary battery may be, not limitedly, a lithium metal secondary battery, a lithium ion secondary battery, a lithium polymer secondary battery, or a lithium ion polymer secondary battery.

The electrochemical device of the present invention may be manufactured according to a common method well known in the art. For example, the method may include the steps of: putting an electrode assembly into an electrochemical device case; and injecting the gel polymer electrolyte composition of the present invention into the case and then polymerizing it to form a gel polymer electrolyte, as mentioned above.

In addition, the electrode of the electrochemical device may be made according to a method well known in the art. For example, solvent, binder, conductive agent, and dispersing agent are mixed and stirred as required with an electrode active material to make slurry, and then it is coated on a current collector made of metal material, and then compressed and dried to make an electrode.

The electrode active material may employ cathode active material or anode active material.

The cathode active material may be lithium transition metal composite oxide such as $LiM_xO_y$ (M=Co, Ni, Mn, $Co_aNi_bMn_c$)(for example, lithium manganese composite oxide such as $LiMn_2O_4$, lithium nickel oxide such as $LiNiO_2$, lithium cobalt oxide such as $LiCoO_2$, or any material obtained by substituting a part of manganese, nickel or cobalt of them with other transition metals, or vanadium oxide containing lithium, or the like) or calcogenide (for example, manganese dioxide, titanium disulfide, molybdenum disulfide and so on), but not limitedly.

The anode active material may use common anode active materials that may be used for an anode of a conventional electrochemical device, and it may be lithium metal, lithium alloy, carbon, petroleum coke, activated carbon, graphite, carbon fiber and so on, which may occlude or emit lithium ion, but not limited thereto. Other metal oxides such as $TiO_2$ and $SnO_2$, having a potential less than 2V against lithium and capable of occluding or emitting lithium, may also be used, but not limitedly. In particular, carbon materials such as graphite, carbon fiber and activated carbon are preferred.

The current collector made of the metal material is a metal having good conductivity and allowing slurry of the electrode active material to be easily adhered thereto, and the current collector may employ any material that has no reactivity within a voltage range of the battery. The cathode current collector may be a foil made using aluminum, nickel or their combination, not limitedly. Also, the anode current collector may be a foil made using copper, gold, nickel or copper alloy, or their combinations, not limitedly.

The separator preferably employs a porous separator, though not specially limited, and it may be polypropylene, polyethylene or polyolefin porous separator, unlimitedly. In addition, the separator may be applied to a battery by means of lamination (or, stacking) or folding of the separator and the electrode as well as winding generally used.

The electrochemical device of the present invention may have any appearance, but the appearance may have a cylindrical shape using a can, an angled shape, a pouch shape or a coin shape.

Hereinafter, the present invention is explained in more detail based on embodiments. However, the embodiments of the present invention may be modified in various ways, and it should be not interpreted that the scope of the present invention is limited to the following embodiments. The embodiments are provided just for better understanding of the present invention to those having ordinary skill in the art.

Embodiment 1

Preparation of Gel Polymer Electrolyte Composition $LiPF_6$ was dissolved into an electrolyte solvent with a composition of EC (ethylene carbonate): EP (ethyl propionate)=2:1 (volume ratio) to have 1 M concentration, thereby making an electrolyte. Based on 100 parts by weight of the electrolyte, 2 parts by weight of dipentaerythritol penta acrylate having five acrylate groups as a monomer for forming gel polymer by polarization and 0.04 parts by weight of t-butyl peroxy-2-ethyl-hexanoate as a polymerization initiator were added to prepare a gel polymer electrolyte composition.

<Preparation of Cathode>

94 weight % of $LiCoO_2$ acting as a cathode active material, 3 weight % of carbon black acting as a conductive agent, and 3 weight % of PVdF acting as a bonding agent were added to N-methyl-2-pyrrolidone (NMP) acting as a solvent to make cathode mixture slurry. An aluminum (Al) film that is a cathode current collector with a thickness of 20☐ is coated with the cathode mixture slurry, and then it is dried to make a cathode. After that, roll pressing was conducted thereto.

<Preparation of Anode>

96 weight % of carbon powder acting as an anode active material, 3 weight % of PVdF acting as a bonding agent, and 1 weight % of carbon black acting as a conductive agent were added to NMP acting as a solvent, thereby making anode mixture slurry. A copper (Cu) film that is an anode current collector with a thickness of 100 is coated with the anode mixture slurry, and then it is dried to make an anode. After that, roll pressing was conducted thereto.

<Manufacture of Battery>

A battery was assembled using the cathode, the anode, and a separator having three layers of polypropylene/polyethylene/polypropylene (PP/PE/PP), and the prepared gel polymer electrolyte composition was injected into the assembled battery and then polymerized at 80° C. for 4 hours under a nitrogen environment to finally manufacture a gel polymer lithium secondary battery.

Comparative Example 1

A battery was manufactured in the same was as the embodiment 1, except that ethyl methyl carbonate (EMC) was used instead of ethyl propionate.

Comparative Example 2

A battery was manufactured in the same was as the embodiment 1, except that gamma-butyrolactone (GBL) was used instead of ethyl propionate.

Comparative Example 3

A lithium ion secondary battery was manufactured in the same was as the embodiment 1, except that dipentaerythritol penta acrylate (gel polymer forming monomer) and t-butyl peroxy-2-ethyl-hexanoate (polymerization initiator) were not used.

Comparative Example 4

A lithium ion secondary battery was manufactured in the same was as the embodiment 1, except that dipentaerythritol penta acrylate and t-butyl peroxy-2-ethyl-hexanoate were not used and ethyl methyl carbonate (EMC) was used instead of ethyl propionate.

Comparative Example 5

A lithium ion secondary battery was manufactured in the same was as the embodiment 1, except that dipentaerythritol penta acrylate and t-butyl peroxy-2-ethyl-hexanoate were not used and gamma-butyrolactone (GBL) was used instead of ethyl propionate.

Experimental Example 1

Evaluation of Rate Capacity of Battery

The batteries manufactured according to the embodiment 1 and the comparative examples 1 to 5 were charged to 4.2V by 0.5C, then charged with keeping a voltage until a current becomes 10% of battery capacity, and then discharged to 3V by 0.2C, 1C, 2C, 3C and 4C, to measure a rate capacity. The results are shown in the following table 1.

In the battery of the embodiment 1, which has gel polymer electrolyte in which carbonate (EC) and linear saturated ester (EP) are mixed as an electrolyte solvent, a discharge capacity was slowly decreased as a discharge current amount was increased. In particular, at a current amount of 2.0C or above, the decrease of discharge capacity was very slowed in comparison to the batteries of the comparative examples 1 to 5 (see Table 1).

Meanwhile, in the batteries of the comparative examples 1 and 2, which have gel polymer electrolyte in which other organic solvent (EMC or GBL) instead of the linear saturated ester is mixed with carbonate (EC) as an electrolyte solvent, a discharge capacity was decreased as a discharge current amount was increased, similar to the batteries of the comparative examples 3 to 5 which have liquid electrolyte. In particular, at a current amount of 2.0C or above, the discharge capacity was rapidly decreased (see Table 1).

In addition, as a result of comparing rate capacities of the batteries of the comparative examples 3 to 5, which have liquid electrolyte, the battery of the comparative example 3 having liquid electrolyte containing carbonate (EC) and linear saturated ester (EP) shows a slightly higher rate capacity. However, a discharge capacity tends to rapidly decrease as a discharge current amount is increased in all of the batteries of the comparative examples 3 to 5 using liquid electrolyte (see Table 1).

Experimental Example 2

Evaluation of Low Temperature Performance of Battery

The batteries manufactured according to the embodiment 1 and the comparative examples 1 to 5 were initially charged and discharged, and then charged at a room temperature in the same voltage range by 1.0C-rate and then discharged by 0.2C-rate. Subsequently, the batteries were charged by 1.0C-rate and then put into a low temperature chamber of −20° C. and discharged by 0.2C-rate. At this time, a ratio of discharge capacities at room temperature and −20° C. is shown in Table 1.

As seen from Table 1, the battery of the embodiment 1 shows most excellent low temperature performance.

Meanwhile, the batteries of the comparative examples 1 and 2 not using linear saturated ester as an electrolyte solvent showed discharge capacities at low temperature not greater than about 50% of the embodiment 1. In addition, the batteries of the comparative examples 3 to 5 having liquid electrolyte showed discharge capacities at low temperature smaller than that of the embodiment 1, and the discharge capacities at low temperature were seriously changed according to the composition of the electrolyte solvent.

Experimental Example 3

Evaluation of Thickness Expansion of Battery

The batteries manufactured according to the embodiment 1 and the comparative examples 1 to 5 were initially charged and discharged, and then they were charged and discharged four times in the same voltage region at a room temperature by 1.0C-rate. Subsequently, they were charged to 4.2V by 1.0C-rate, and then the temperature was raised from the room temperature to 90° C. for 1 hour. They were kept four hours at 90° C., and then a ratio of thickness expansions at room temperature and 90° C. was measured, as shown in Table 1.

As seen from Table 1, the battery of the embodiment 1 shows very low thickness expansion, which ensures excellent electrochemical stability. The battery of the comparative example 2 shows slightly lower thickness expansion than the battery of the embodiment 1, but it would be understood that the battery of the comparative example 2 is very worse than the battery of the embodiment 1 in aspect of rate capacity and low temperature performance.

In addition, the batteries of the comparative examples 1, 3 and 5 show greater thickness expansion than that of the embodiment 1, and particularly the batteries of the comparative examples 3 and 5 having liquid electrolyte show about double thickness expansion or more in comparison to that of the embodiment 1.

TABLE 1

| | Rate Capacity (%) | | | | | Low Temperature Capacity (%) | Thickness Expansion (%) |
|---|---|---|---|---|---|---|---|
| | 0.2 C | 1 C | 2 C | 3 C | 4 C | | |
| Embodiment 1 | 100 | 98 | 93 | 85 | 79 | 56 | 21 |
| Comparative Example 1 | 100 | 91 | 80 | 51 | 35 | 30 | 25 |
| Comparative Example 2 | 100 | 90 | 34 | 17 | 9 | 11 | 19 |
| Comparative Example 3 | 100 | 98 | 82 | 69 | 58 | 50 | 43 |
| Comparative Example 4 | 100 | 92 | 61 | 42 | 35 | 20 | 51 |
| Comparative Example 5 | 100 | 89 | 37 | 13 | 9 | 5 | 40 |

INDUSTRIAL APPLICABILITY

The gel polymer electrolyte according to the present invention has excellent electrochemical stability, excellent mechanical strength and excellent lithium ion conductivity since a compound having at least two double bonds at its end is used as a monomer for forming gel polymer by polymerization, and an electrolyte solvent is made by mixing carbonate and linear saturated ester. In addition, a secondary battery including the gel polymer electrolyte can improve various performances such as room/low temperature characteristics, rate capacity and so on.

The invention claimed is:

1. A gel polymer electrolyte composition, comprising:

i) a compound acting as a monomer for forming gel polymer by polymerization and having at least three double bonds at an end thereof;

ii) an electrolyte solvent containing carbonate and linear saturated ester, wherein the carbonate consists of ring carbonate;

iii) an electrolyte salt; and iv) a polymerization initiator, wherein the linear saturated ester is included in the content of 10 to 90 parts by weight, based on 100 parts by weight of the carbonate, wherein the ring carbonate is one or more selected from the group consisting of ethylene carbonate (EC) and propylene carbonate (PC), and wherein the linear saturated ester is one or more selected from the group consisting methyl propionate, and ethyl propionate.

2. The gel polymer electrolyte composition according to claim 1, wherein the compound having at least three double bonds at an end is a compound having at least three (meth) acrylate groups or vinyl groups at an end thereof.

3. The gel polymer electrolyte composition according to claim 1, wherein the compound having at least three double bonds at an end is a compound expressed by the following chemical figure 1:

Chemistry FIG. 1

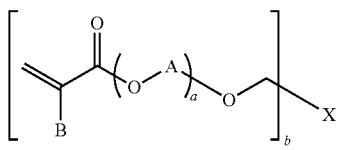

where A is alkylene of $C_1$~$C_{12}$ or haloalkylene of $C_1$~$C_{12}$; a is an integer of 0~30; B is H or methyl group; b is an integer of 3~6; X is

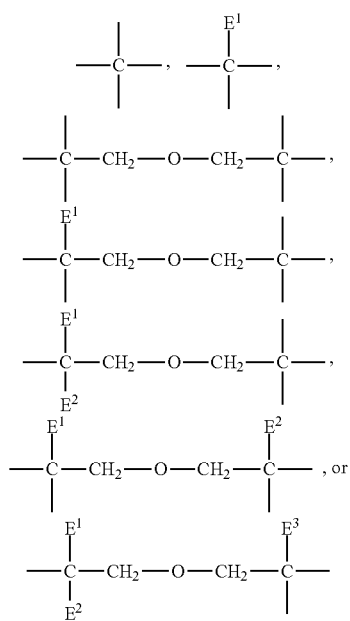

where $E^1$ to $E^4$ are respectively hydrogen, alkyl group of $C_1$~$C_{12}$, haloalkyl group of $C_1$~$C_{12}$, or hydroxyalkyl group of $C_1$~$C_{12}$ independently, and m is an integer of 0~30.

4. The gel polymer electrolyte composition according to claim 1,
wherein the compound having at least three double bonds at an end is any one or a combination of at least two selected from the group consisting of trimethylolpropane triacrylate, trimethylolpropane ethoxylate triacrylate, trimethylolpropane propoxylate triacrylate, ditrimethylolpropane tetraacrylate, pentaerythritol tetraacrylate, pentaerythritol ethoxylate tetraacrylate, dipentaerythritol pentaacrylate, and dipentaerythritol hexaacrylate.

5. The gel polymer electrolyte composition according to claim 1,
wherein the compound having at least three double bonds at an end is included in the content of 0.5 to 10 parts by weight, based on 100 parts by weight of the gel polymer electrolyte composition.

6. A gel polymer electrolyte formed by polymerizing the gel polymer electrolyte composition of claim 1.

7. The gel polymer electrolyte according to claim 6,
wherein the gel polymer electrolyte is formed by means of in-situ polymerization of the gel polymer electrolyte composition inside an electrochemical device.

8. The gel polymer electrolyte according to claim 6,
wherein the gel polymer electrolyte is formed by polymerizing the gel polymer electrolyte composition under an inert condition.

9. An electrochemical device, comprising a cathode, an anode, and the gel polymer electrolyte defined in claim 6.

10. The electrochemical device according to claim 9,
wherein the electrochemical device is a lithium secondary battery.

11. The gel polymer electrolyte composition according to claim 1, wherein the ring carbonate is ethylene carbonate (EC) and the linear saturated ester is ethyl propionate (EP).

\* \* \* \* \*